United States Patent [19]

Pierson

[11] 4,347,824

[45] Sep. 7, 1982

[54] LPG FUEL SUPPLY SYSTEM

[75] Inventor: William V. Pierson, Ventura, Calif.

[73] Assignee: I.C.E. Company, Inc., Ventura, Calif.

[21] Appl. No.: 163,316

[22] Filed: Jun. 26, 1980

[51] Int. Cl.³ .............................................. F02M 15/00
[52] U.S. Cl. .................................... 123/527; 123/525; 48/184
[58] Field of Search ................. 123/525, 527; 261/59, 261/69 R; 48/180 H, 184

[56] References Cited

U.S. PATENT DOCUMENTS

| | | | |
|---|---|---|---|
| 2,248,222 | 7/1941 | Ensign | 48/184 |
| 2,339,988 | 1/1944 | Gerson | 123/525 |
| 2,696,714 | 12/1954 | Hughes | 123/527 |
| 2,745,727 | 5/1956 | Holzapfel | 48/184 |
| 2,752,758 | 7/1956 | Tann | 123/527 |
| 3,068,086 | 12/1962 | Ensign | 48/184 |
| 3,081,160 | 3/1963 | Ensign | 123/527 |
| 3,123,451 | 3/1964 | Bauerstock | 48/184 |
| 3,184,295 | 5/1965 | Bauerstock | 123/525 |
| 3,565,201 | 2/1971 | Petsinger | 123/527 |
| 4,098,248 | 7/1978 | Todd | 123/27 GE |

*Primary Examiner*—Ronald H. Lazarus
*Attorney, Agent, or Firm*—David O'Reilly

[57] ABSTRACT

A fuel supply system for an internal combustion engine operated on gaseous fuels, for example, liquid petroleum gas (LPG). The system includes a housing having a chamber for vaporizing liquid gas, including means for heating the vaporizing chamber. Also included in the housing is a mixing chamber for mixing the vaporized gas with incoming air for delivery to the intake manifold of an internal combustion engine through a standard carburetor. The fuel supply system includes means for mounting the system on the carburetor, including means for supporting an air filter circumjacent the mixing chamber.

25 Claims, 11 Drawing Figures

LPG FUEL SUPPLY SYSTEM

BACKGROUND

This invention relates to fuel supply systems, and, more particularly, relates to an LPG fuel supply system.

Internal combustion engines commonly use an LPG in the form of butane or propane, or mixtures thereof, as a fuel. Generally, these systems include a separate vaporizer which is heated from hot water supplied from the engine, and then delivered to a mixer separately mounted on or proximate the carburetor or intake manifold of an internal combustion engine. The LPG fuel is delivered to the vaporizer, where it is converted from liquid to a gaseous state at a predetermined low pressure. The vaporizer fuel then passes through a pipe to a mixer where it is mixed with atmospheric air. The combustible mixture of air and vaporized fuel is then delivered to the intake manifold of an internal combustion engine for burning. Such a system is disclosed and described in the Patent of Baverstock, U.S. Pat. No. 3,123,451, issued Mar. 3, 1964. The separate constuction, mounting, and operation of vaporizing and mixing systems at different locations increases the complexity of the device, and the pipe connections also increase the potential for leaks in the system. In addition, the separately constructed and mounted vaporizing and mixing units provide additional crowding of the already crowded engine compartment of modern-day vehicles.

SUMMARY

The purpose of the present invention is to provide an improved LPG fuel supply system which is compact in construction and simple in operation.

The LPG fuel supply system of the present invention is comprised of a single housing adapted for mounting on a conventional carburetor, having a vaporizer and mixer in a single unit. The vaporizer receives liquified gas which is vaporized in a heat exchange process by hot water circulated in the housing from the engine. The flow of liquified gas into the vaporizing chamber is controlled by an adjustable diaphragm-operated valve. The vaporized fuel is delivered through a dual-flow control valve to a mixing chamber for mixture with atmosphered air, which mixture then flows into the intake manifold through the carburetor.

The duel-flow control valve is responsive to varied engine conditions for metering fuel to the engine at one rate during idling conditions, and at a different rate during heavy load conditions. The dual-flow control valve is constructed to be separately adjustable to adjust the metered flow for idling conditions as well as adjusting the metered flow for full load conditions. The idle adjustment includes a valve within a valve, providing a metered flow of fuel to the mixing chamber responsive to conditions in the engine intake manifold, whereby the idle adjustment is effective at the time of starting and at idling speeds, and is easily adjusted. The full load adjustment is also extremely simple and is comprised of a main valve responsive to conditions in the engine intake manifold whereby the full load adjustment is effective during normal driving conditions and in maximum demand, and is also readily adjusted.

An air valve is provided for supplying restricted, controlled flow of air to the mixing chamber during operation of the engine on LPG fuel, and includes means for switching to free, unrestricted air flow during gasoline fuel operation of the engine. An actuating device is provided for switching the air valve from a free flow of air when the fuel being delivered to the engine is gasoline, to a restricted, controlled flow of air during LPG fuel operation. The housing also includes flanges for securing mounting plates to support a cylindrical air filter around the air valve.

It is one object of the present invention to provide an LPG fuel supply system which is simple and compact in construction.

Another object of the present invention is to provide an LPG fuel supply system which provides for idle adjustment and full flow adjustment of vaporized LPG fuel.

Still another object of the present invention is to provide an LPG fuel supply system having an air valve for switching the internal combustion engine from gasoline fuel operation to LPG fuel operation.

Yet another object of the present invention is to provide an LPG fuel supply system which has a vaporizing unit and mixing unit in a single housing.

Still another object of the present invention is to provide an LPG fuel supply system having a dual adjustable flow control valve responsive to engine conditions for separate adjustment of idle and full load conditions.

Other objects, advantages, and novel features of the invention will become apparent from the following detailed description, when considered in conjunction with the accompanying drawings, wherein like reference numbers identify like parts throughout, wherein.

DESCRIPTION OF THE PREFERRED EMBODIMENT

Figure 1:
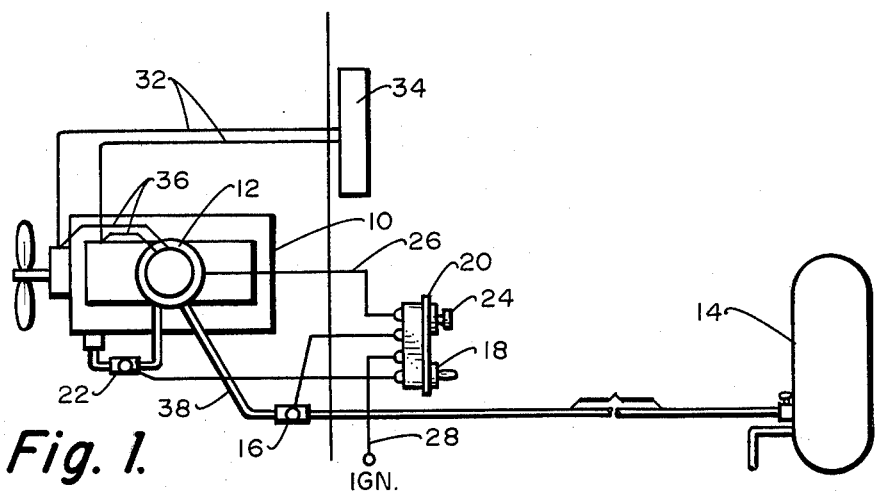
FIG. 1 is a schematic plan view of an internal combustion engine having the LPG fuel supply system according to the invention.

An internal combustion engine having an LPG fuel supply system according to the invention for use in conjunction with normal gasoline operation is illustrated in FIG. 1. The internal combustion engine is schematically shown at 10, having the LPG fuel supply system 12 mounted on the carburetor (not shown). The LPG fuel is supplied from a storage tank 14 through lock-out valve 16 to the LPG fuel supply system 12. The lock-out valve 16 is controlled by a toggle switch 18 mounted on a control panel 20 in the vehicle. The toggle switch 18 also controls a lock-out valve 22 for controlling the flow of gasoline to the engine 10 when the LPG fuel supply system is not in use. The toggle switch 18 is a two-positioned switch which turns lock-out valve 16 on, and lock-out valve 22 off, or vice versa. The toggle switch 18 is connected to the ignition by means of wire 28, automatically shutting off both lock-out valves 16 and 22 when the ignition is off. The control panel 20 also includes a control 24, connected by means of a cable 26 to the LPG fuel supply system for switching the air valve from LPG operation to gasoline operation of the internal combustion engine 10. Hot water lines 32 are connected to the heater 34, as well as to the LPG fuel supply system 12, as will be described in greater detail hereinafter.

Figure 2:
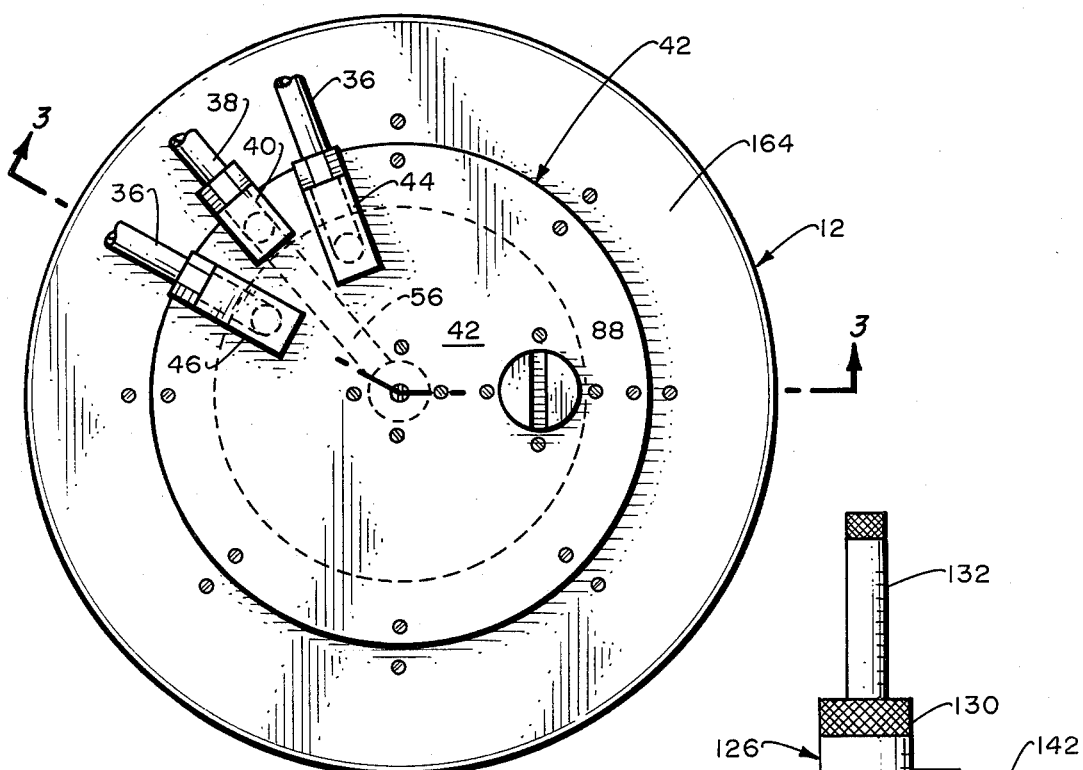
FIG. 2 is a top view of the LPG fuel supply system of the invention.
Figure 3:
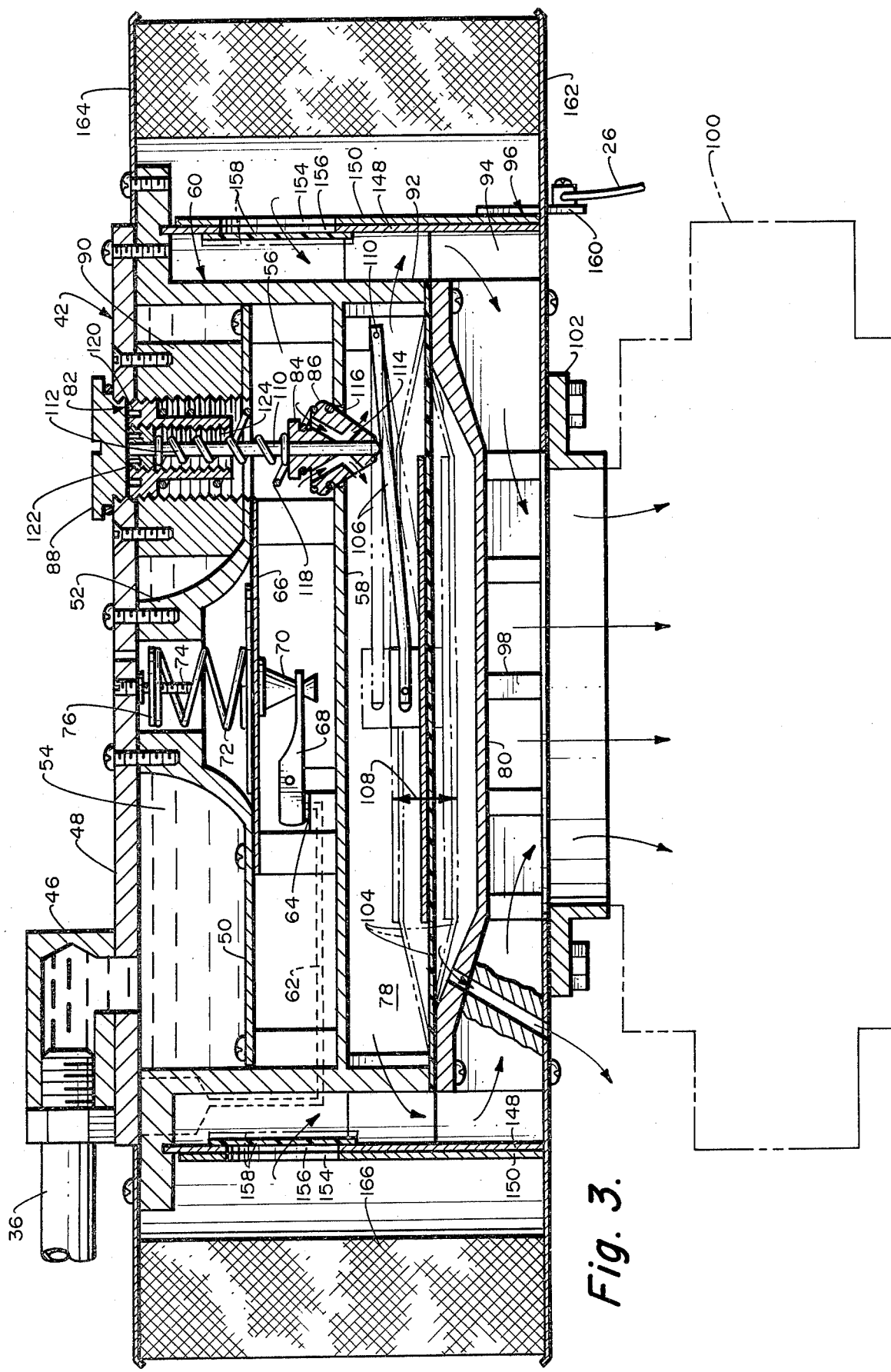
FIG. 3 is a sectional view of the LPG fuel supply system, taken at 3—3 of FIG. 2.
Figure 5:
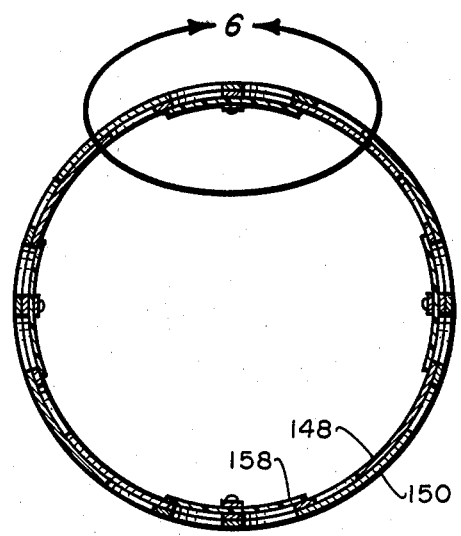
FIG. 5 is a sectional view of the air valve of the LPG fuel system of FIG. 3.
Figures 10, 11:
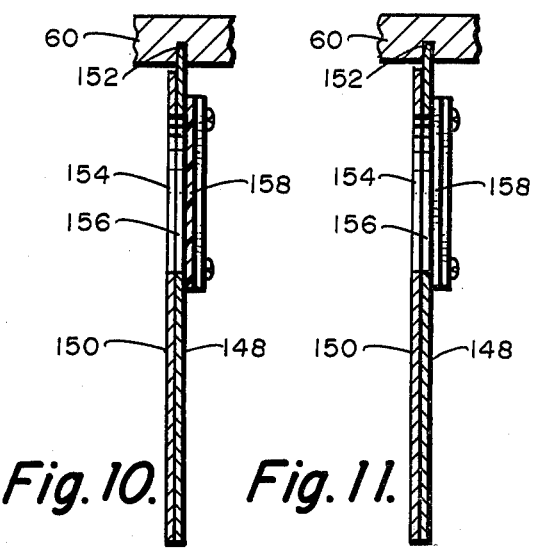
FIGS. 6 through 11 are partial sectional views illustrating the construction and operation of the air valve of the LPG fuel supply system.
Figure 6:
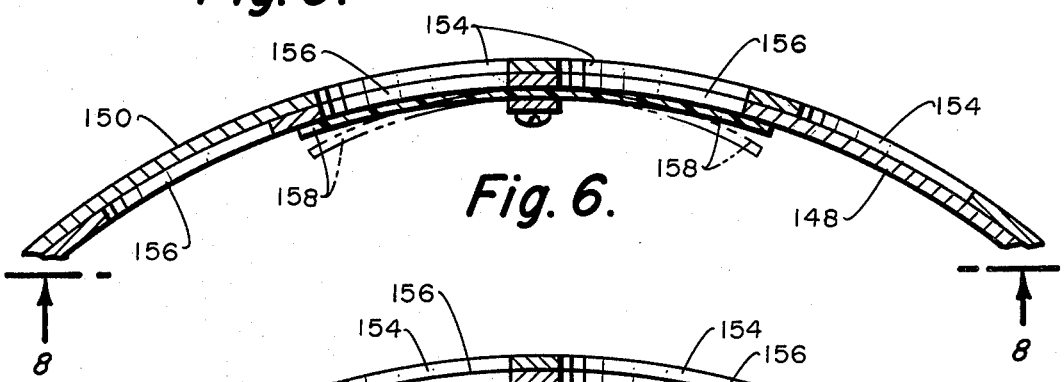
Figure 7:
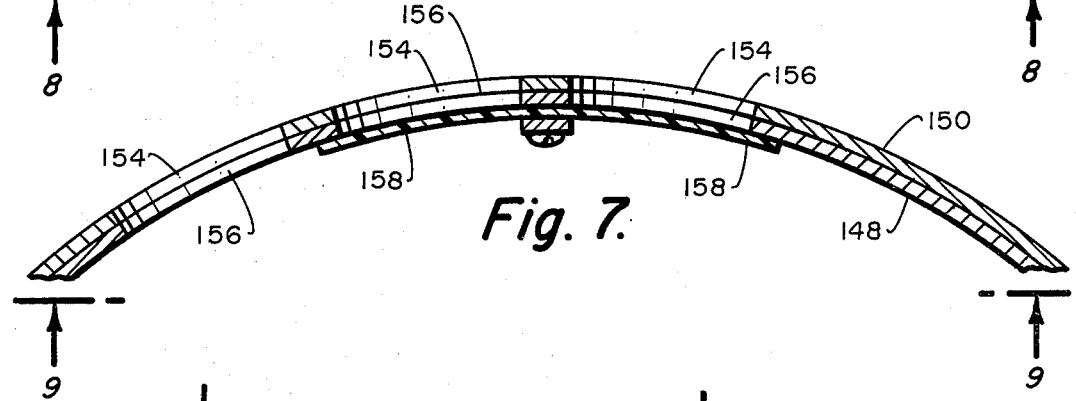
Figure 8:
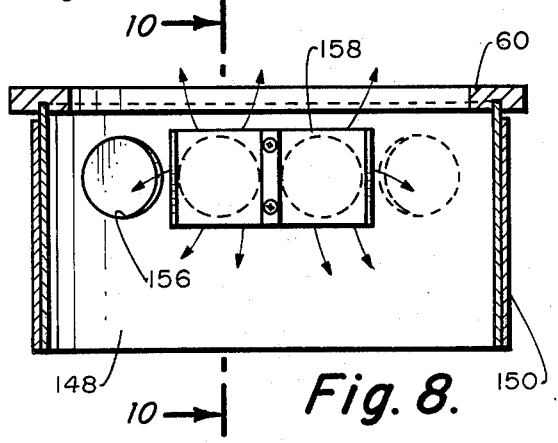
Figure 9:
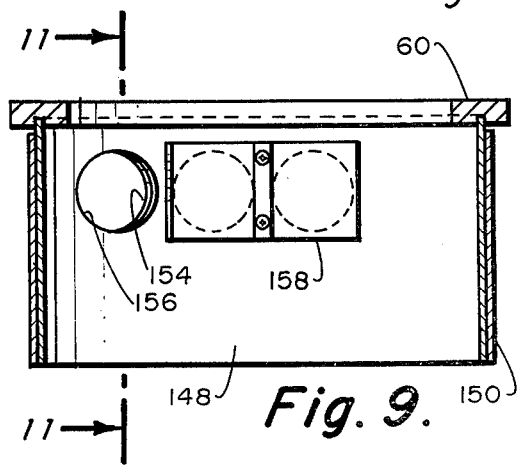

The LPG fuel supply system 12 can be seen in greater detail in FIGS. 2 and 3. FIG. 2 is a top view showing the hose connection 40 for supplying liquified gas through hose or pipe 38 to the fuel system 12. Hot water from the engine 10 is supplied by means of hoses 36 connected to the LPG housing 42 by means of fixtures 44 and 46. Water is circulated through the housing 42, in fixture 44 and out fixture 46, or vice versa. A circular chamber is formed between a top cover 48, and a first stage cover 50, having a center boss 52. The chamber 54 formed between these two covers is separated by means of a web 56, so that water circulated around the boss 52, from one side of the circular chamber to the other. The first stage cover plate 50 also forms a vaporizing chamber 56 between the bottom plate 58 of the main frame 60 of the housing 42. Thus, the cover plate 50 is in heat exchange relationship between the vaporizing chamber 56 and the hot fluid circulating chamber 54.

Liquified gas is delivered from fixture 40 through conduit 62 and regulating valve 64 to the vaporizing chamber 56. The regulator valve 64 is responsive to the pressure in the vaporizing chamber, acting on a diaphragm 66 connected at 70 to lever 68 for operating the inlet valve 64. A spring 72, behind the diaphragm 66, normally holds the valve 64 in the open position. As liquid gas flows into the vaporizing chamber 56 and expands, exerting a pressure on the diaphragm 66, the valve 64 is slowly closed when the pressure reaches a predetermined amount. The amount of pressure to close the valve 64 can be varied by means of a screw 74 passing through a threaded washer 76, securely fastened to the top of spring 72. By rotation of the screw 74, the amount of compressive force of the spring 72 is varied, changing the responsive pressure of the diaphragm 66.

The vaporized LPG fuel is delivered from the vaporizing chamber 56 to a low-pressure cavity 78 formed between a low-stage (i.e. second stage) cover 80 and the bottom plate 58 of the main frame 60. The flow of vaporized fuel from chamber 56 to a low-pressure chamber 78 is controlled by dual flow control valve 82. Dual flow control valve 82 has dual concentric heads 84 and 86, providing for idle adjustment and full load adjustment, as will be described in greater detail hereinafter. Access to the dual flow control valve 82 is provided through a cap 88, mounted in housing cover 48. Threaded sleeve 90 separates the dual flow control valve 82 from the hot water circulating chamber 54. The vaporized fuel flows from the chamber 56 into the low-pressure cavity 78, through holes (not shown) in the side wall 92 of the main frame 60, into a mixing chamber 94, for mixing with atmospheric air.

Atmospheric air is supplied through air valve 96, surrounding the peripheral mixing chamber, 94, between the outer wall of the main frame 60 and the inside of the cylindrical air valve 96. The fuel-air mixture then flows through vanes 98 on the low pressure cavity cover 80 into the intake manifold of an engine, through a carburetor 100, indicated by phantom lines. An adaptor 102 is provided for securing the LPG fuel supply system to a conventional carburetor.

Fuel flow into the low-pressure cavity 78 is responsive to the downstream pressure in the intake manifold because of the operation of diaphragm 104 controlling the operation of flow control valve 82 through operating arm 106. The flow control operating arm 106 moves up and down, as illustrated at 108, with the diaphragm 104 responsive to the vacuum in the engine. As the arm 106, which is pivotally supported at 110 moves up and down with the diaphragm, it opens and closes the dual valve 82, controlling the flow of vaporized fuel to the low-pressure cavity 78.

At idle, the vacuum will be low, and the actuating arm 106 will open only the idle valve head 84 attached to the rod 110. Spring 112 biases the valve head 84 toward a closing position, sealing ports 114 in second valve head 86. At maximum load conditions, the actuating arm 106 will move the shaft 110 completely up until it engages the main valve head 186 opening that valve, allowing flow through port 116 in the main frame bottom plate 58. Thus, maximum vaporized fuel flow is accomplished around the valve head 86 through port 106, as well as through ports 114 in the valve head itself.

The main valve head 86 is biased toward a closed position by means of spring 118 compressed between the head 86 and the shank of adjustably threaded collar 120. The idle valve head 84 is adjusted by means of insert 122, threadably engaged in the collar 120. The collar 120 has internal threads 124, allowing the insert 122 to be adjusted, varying the compressive force on spring 112, biasing idle valve head 84 toward a closed position. By this means, idle valve head 84 can be separately adjusted, as can the main valve head 86, by means of threaded collar 120. The threaded collar 120 is threadably engaged in the sleeve 90, for adjustment, to vary the compressive force of spring 118 on the main valve head 86.

Figure 4:
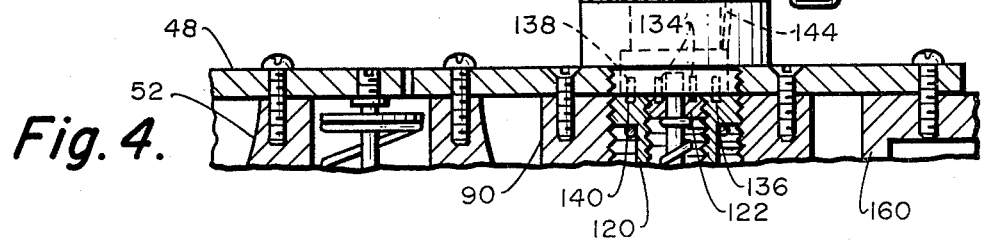
FIG. 4 is a partial section of the LPG fuel supply system, illustrating idle and full load adjustments.

The calibration and adjustment of the idle valve head 84, and the main valve head 86, are illustrated in the partial sectional view of FIG. 4. The cap, or plug, 88 is first removed from the cover 48, and a calibrating tool secured to this cover by means of a socket 128. The calibrating tool has two concentric, rotatable members 130 and 132. The rotating member 132 has pins 134, engaging holes 136 in insert 122, while the outer rotatable, adjustable member 130 has pins 138 engaging sockets 140 in collar 120. A vacuum pressure gauge 142 is connected through a conduit 144 to the interior of the vaporizing chamber 56. With the calibrating tool 126 installed as described, the idle adjustment can be performed by rotating concentric member 132, which in turn rotates the insert or plug 122, to vary the force on the spring 112, thereby adjusting the opening and closing of ports 114 by idle valve head 84.

Adjustment of the dual flow control valve 82 for full load operation is provided through rotation of concentric member 130, having pins 138 engaging the collar 120. The collar is threaded into the sleeve 90, and by rotation of the member 130, the collar 120 threads into the sleeve 90, to increase or decrease the compressive force of the spring 118 on the main valve head 86. Thus, the amount of force and opening of the main port 116 is controlled. Once the calibration for idle and full load conditions is complete, the calibrating tool 126 may be removed, and the cap 88 replaced, and the engine is now ready for operation.

Since the operation of the engine on LPG fuel is different from the operation on regular gasoline, an air valve 96 is provided to vary the air flow into the mixing chamber 94. The air valve is comprised of two telescoping, tubular members 148 and 150, which regulate the air flow into the mixing chamber 94. The operation of the air valve can be seen in greater detail in FIGS. 5 through 11. Each of the tubular, telescoping members 148 and 150 has a plurality of apertures which move in and out of registration, as the two members are rotated with respect to each other. For purposes of the present invention, the inner tubular member 148 is secured to the main frame 60, as shown at 152. Thus, the inner, tubular member 148 is held stationary, while the outer, tubular member 150 is permitted to move a predetermined amount to control the flow of air through apertures in each member.

Each of the members has three adjacent holes, equally spaced around the circumference at approximately 90 degrees. Thus, the outer member 150 has four sets of three holes 154, identical in size to holes 156 in the inner, tubular member 148. Thus, for purposes of the present invention, there are four sets of three identical holes, equally spaced, approximately 90 degrees, providing 12 holes in each member. Two of the holes of each set in the inner member are covered by a flexible reed-like member, 158 for restricting the flow of air into the mixing chamber when the engine is operating on LPG fuel. For gasoline operation, some of the apertures in the tubular members 148 and 150 will be in registration, allowing substantially free unrestricted air flow through the air valve 96.

The outer, tubular member 50 is adjusted through a cable 26 attached to a tab 160, secured to the outer, tubular member 150. A slot (not shown) in cover member 162 limits the movement of the outer, tubular member 150, with respect to the inner, tubular member 148, thus providing an open or closed position for the flow of air into the mixing chamber 94. In the position shown in FIGS. 6 and 8, only the holes behind the flexible reed 158 are in registration, and the device is set for LPG fuel operation. Air will flow in around the flexible reed-like member as indicated by the arrows.

The cable control 24 would be labelled "LPG In" and "Gasoline Out" or vice versa, as desired. Thus, with the cable control 24 pushed in, air would have to flow through the apertures in registration beneath the reed 158, providing a slow control flow of air beneath the reed 158, into the mixing chamber 96. With the cable control knob 24 in the out position, two of the apertures 154 and 156 of each set will be in registration, allowing substantially unrestricted free flow of air into the mixing chamber 94, for gasoline operation of the engine. Air flowing through the apertures in the air valve 96 is delivered through a cylindrical air filter 166, supported between outward extending covers 162 and 164, securely attached to the housing 42. The covers 162 and 164 are easily removed for replacing the air filter 166 at predetermined intervals.

In operation, the LPG fuel supply system operates to deliver vaporized, butane or propane gas, or a mixture thereof, to the mixing chamber 94 for mixing with air, which is then delivered to the intake manifold or carburetor of an internal combustion engine. Hot water, circulated through fitting 44, around circular chamber 54, divided by web or partition 56, and out through fitting 46, provides heat for vaporizing chamber 56. LPG gas is delivered through fitting 40 to vaporizing chamber 56 when the switch 18 is in the LPG position, opening lock-out valve 16 and closing gasoline lock-out valve 22. This allows LPG fuel to flow from storage tank 14 through line 38 into the LPG fuel supply system 12. The LPG fuel flows through normally opened valve 64 into the vaporizing chamber 56, wherein it expands, exerting a pressure on diaphragm 66, closing the valve 64 at a predetermined pressure. The heat exchanged through the cover plate 50 causes the gas to expand for delivery through dual flow control valve 82.

Flow of the vaporized fuel is controlled in response to the engine operation by means of actuating arm 106, attached to diaphragm 104, open to the intake manifold vacuum pressure through the carburetor throat. As the actuating arm 106 moves upward, it engages the rod or shaft 110, opening the first valve head or idling valve head 84. As demand is increased, the actuating arm 106 will move further upward to engage the end of the main valve head 86, opening the main port 116 into the low-pressure cavity 78, delivering a larger volume of vaporized fuel for mixing with air in the mixing chamber 94.

At the same time, air is flowing through air control valve 96, having apertures above the entrance area of vaporized fuel for mixing with the vaporized fuel for delivery through vanes 98 in bottom plate 80, to the engine for burning. When it is desired to switch to gasoline operation, switch 18 is operated, closing lock-out valve 16, and opening lock-out valve 22. At the same time, cable control knob 24 is moved to open the air valve 96 for the free flow of air into the intake manifold.

Thus, there has been disclosed a compact, relatively simple LPG fuel supply system for attachment to conventional internal combustion engines, to convert the engines for operation on either standard gasoline or LPG fuels, such as butane or propane, or mixtures thereof.

Obviously, many modifications and variations of the invention are possible in light of the above teachings. It is therefore to be understood that the full scope of the invention is not limited to the details disclosed herein, but only by the claims, and may be practiced otherwise than as specifically described.

What is claimed is:

1. An LPG fuel supply system for internal combustion engines comprising:
   a housing having a fuel vaporizing chamber, a hot fluid circulating chamber adjacent said fuel vaporizing chamber and an air-fuel mixing chamber;
   fuel inlet conduit means to said vaporizing chamber;
   fuel inlet valve means in said vaporizing chamber responsive to the pressure in said vaporizing chamber to control the flow of fuel from said inlet conduit to said vaporizing chamber;
   fuel flow regulation valve means between said fuel vaporizing chamber and said air-fuel mixing chamber;
   fuel flow regulating valve activating means responsive to downstream pressure for activating said fuel flow regulating valve means; and
   air inlet means to control the flow of air to said air-fuel mixing chamber;
   mounting adapter means for mounting said housing on a carburetor of an internal combustion engine.

2. The LPG fuel supply system according to claim 1 in which said fuel inlet valve means comprises:
   a flexible diaphragm in said vaporizing chamber operatively connected to said fuel inlet valve;
   biasing means biasing said diaphragm to hold said fuel inlet valve open when the pressure in said fuel vaporizing chamber is below a predetermined amount.

3. The LPG fuel supply system according to claim 2 wherein said biasing means is a coil spring behind said diaphragm.

4. The LPG fuel supply system according to claim 3, including means for adjusting the force applied by said biasing spring on said diaphragm thereby adjusting said predetermined pressure.

5. The LPG fuel supply system according to claim 4 wherein said means for adjusting the biasing force comprises:
   a threaded washer attached to said spring;
   a screw threaded through said washer whereby rotation of said screw increases or decreases the compression of said coil spring.

6. The LPG fuel supply system according to claim 2 in which said fuel inlet valve means includes:
   a pivotally mounted lever for opening and closing said valve; and
   connecting means connecting said lever to said diaphragm for movement therewith.

7. The LPG fuel supply system according to claim 1 in which said fuel flow regulating valve means comprises:
   a pair of dual concentric valve means;
   said fuel flow regulating valve actuating means adapted to activate said duel concentric valve means sequentially.

8. The LPG fuel supply system according to claim 7 in which said valve activating means is adapted to open one of said dual valves during low volume flow and open both of said valves during high volume flow.

9. The LPG fuel supply system according to claim 8 in which said fuel flow regulating valve comprises:
   a part between said vaporizing chamber and said air-fuel mixing chamber;
   a first valve head engaging said part;
   fuel flow parts in said first valve head;
   a second valve head within said first valve head for opening and closing said parts.

10. The LPG fuel supply system according to claim 9 in which said valve activating means comprises:
    a diaphragm responsive to engine manifold pressure;
    a pivotally mounted lever connected for movement with said diaphragm;
    said pivotally mounted lever adapted to operatively engage said fuel flow regulating valve whereby the fuel flow regulating valve is responsive to the downstream engine manifold pressure.

11. The LPG fuel supply system according to claim 10 in which said fuel flow regulating valve includes:
    a pin attached to said second valve head extending through said first valve head for operative engagement by said lever;
    biasing means biasing said pin into an extended position beyond said first valve head whereby said pivotally mounted lever operatively engages said pin to open said second valve head before operatively engaging and opening said second valve head.

12. The LPG fuel supply system according to claim 10 including calibrating means for calibrating the dual flow regulating valve assembly to operate at predetermined engine manifold vacuum pressures.

13. The LPG fuel supply system according to claim 12 in which said calibrating means includes:
    pin bias adjustment means for adjusting the biasing force on said pin;
    first valve head biasing means for biasing said first valve head toward a closed position; and
    first valve head bias adjustment means for adjusting the biasing force on said first valve head.

14. The LPG fuel supply system according to claim 13 in which said pin bias adjustment means is separately adjustable from said first valve head adjustment means whereby the low volume flow and high volume flow can be separately calibrated.

15. The LPG fuel supply system according to claim 14 in which said first valve bias adjustment means comprises:
    a threaded sleeve mounted in said housing;
    a threaded collar threadably inserted in said threaded cylinder;
    said first valve head biasing means being compressively mounted between said threaded collar and said first valve head means whereby the position of said threaded collar in said threaded cylinder determines the force of said biasing means on said first valve head.

16. The LPG fuel supply system according to claim 15 in which said pin bias adjustment means comprises:
    a threaded bore in said threaded collar;
    a threaded insert threadably inserted in said threaded bore;
    said pin biasing means being compressively mounted between said threaded insert and said second valve head means whereby the position of said threaded insert in said bore determines the force of said pin biasing means on said pin.

17. The LPG fuel supply system according to claim 1 in which said air-fuel mixing chamber is substantially circumjacent to said fuel-vaporizing chamber and said hot fluid circulating chamber in said housing.

18. The LPG fuel supply system according to claim 17 in which said air inlet means is an adjustable air inlet valve means substantially circumjacent said air-fuel mixing chamber.

19. The LPG fuel supply system according to claim 18 in which said adjustable air inlet valve means comprises:
    a pair of thin-walled circular members; said circular members being assembled concentrically, one inside the other;
    a plurality of apertures in said circular members;
    moving means for moving said circular members to vary the amount of registration of said apertures whereby the amount of air flow to said air-fuel mixing chamber may be varied.

20. The LPG fuel supply system according to claim 19 including:
    means for holding one of said circular members stationary; and
    means for rotating the other of said members to vary the amount of registration of said apertures.

21. The LPG fuel supply system according to claim 20 including restricting means for restricting the flow of air through said air valve apertures during one mode of operation.

22. The LPG fuel supply system according to claim 21 in which said restricting means comprises at least one flexible reed-like means covering the apertures in one of said circular member whereby air is required to flow through said reed-like means to provide a restricted demand responsive flow through said air inlet valve means.

23. The LPG fuel supply system according to claim 22 in which the inner member of said concentric circular members is clamped between upper and lower covers of said housing; and said moving means comprises cable means attached to the outer concentric circular member for rotating said outer member around said inner member.

24. The LPG fuel supply system according to claim 23 in which said housing includes means for holding a cylindrical air filter in encircling relationship to said housing.

25. The LPG fuel supply system according to claim 24 wherein said means for holding said air filter comprises extensions of said top and bottom covers of said housing.

* * * * *